US007335886B2

(12) United States Patent
Eskildsen et al.

(10) Patent No.: US 7,335,886 B2
(45) Date of Patent: Feb. 26, 2008

(54) RECESSED CEILING MOUNTED PASSIVE INFRARED DETECTOR

(75) Inventors: Kenneth G Eskildsen, Great Neck, NY (US); Robert E Lee, Garden City, NY (US)

(73) Assignee: Honeywell International Inc., Morristown, NJ (US)

( * ) Notice: Subject to any disclaimer, the term of this patent is extended or adjusted under 35 U.S.C. 154(b) by 172 days.

(21) Appl. No.: 11/113,420

(22) Filed: Apr. 22, 2005

(65) Prior Publication Data

US 2006/0237651 A1 Oct. 26, 2006

(51) Int. Cl.
*G01J 5/02* (2006.01)

(52) U.S. Cl. ...................................................... 250/342

(58) Field of Classification Search ................ 250/342, 250/DIG. 1

See application file for complete search history.

(56) References Cited

U.S. PATENT DOCUMENTS 5,308,985 A * 5/1994 Lee ............................ 250/353
5,782,438 A * 7/1998 Hubben et al. ............ 248/27.3
5,790,040 A * 8/1998 Kreier et al. ............ 340/693.1
6,642,846 B1 * 11/2003 Krubiner et al. ......... 340/545.3

* cited by examiner

*Primary Examiner*—David Porta
*Assistant Examiner*—Mark R Gaworecki
(74) *Attorney, Agent, or Firm*—Anthony R. Barkume, PC

(57) ABSTRACT

A ceiling-mounted passive infrared detector assembly (30) that has three main components: a junction box (10) which is adapted to be mounted within an opening in a ceiling; a cover (44) adapted to mate with the junction box (10); and an electronic passive infrared detector subassembly (43) including an infrared sensor (42) and processing circuitry (45) for processing electrical signals generated by the infrared sensor (42) and producing output signals. The cover (44) has mounting means such as a flange (48) adapted to mount to the junction box (10) (or directly to a ceiling if a junction box is not used) and an extended portion (50) with a cavity (52) and an aperture (46). The cover (44) also has a lens array (36) located across the aperture (46). The electronic passive infrared detector subassembly (43) is located with respect to the cover (44) such that the infrared sensor (42) is aligned with the lens array (36) when the cover (44) is mounted to the junction box (10) such that the infrared sensor (42) detects infrared energy passed through the lens array (36) from a field of view defined by the juxtaposition of the lens array (36) and the infrared sensor (42).

16 Claims, 8 Drawing Sheets

SECTION A-A

RECESSED CEILING MOUNTED PASSIVE INFRARED DETECTOR

TECHNICAL FIELD

This invention relates to security systems, and in particular to a passive infrared sensor that may be mounted within a junction box within a ceiling space of a premises.

BACKGROUND ART

Passive infrared (PIR) sensors detect intruders moving within its field of view by detecting the heat radiated by an intruder. Typically, the ideal mounting location for the sensor is close to the ceiling in the corner of the space to be protected. As such, most PIR sensors available on the market today are designed for corner mounting (such as shown in FIG. 1). The problem with this arrangement is that it is difficult to pre-wire this type of sensor in a new construction project. In a new construction project, an alarm installer will pre-wire the system with wiring harness 6 and place single gang junction boxes in the locations where the sensors will be located. After the construction is complete (drywall 8 installed and painted) the installer will return and install the sensors in the junction boxes. However, this is not possible for corner mounted PIR sensors 2 since the corner of the room is constructed with several 2×4 studs 4 and will not readily accept a junction box without compromising the structural integrity. Existing flush mount detectors try to solve this problem but they are designed for wall mount only and because of this the field of view will not completely protect a rectangular room.

DISCLOSURE OF THE INVENTION

This invention solves this problem because the sensor is designed to be recess mounted in the ceiling of the corner of the space to be protected. This location will allow pre-wiring of a junction box because there aren't any structural members in this location. The spirit of this invention is the arrangement of the electronics and optics to facilitate this type of mounting. In addition, the resulting product is sleeker and less intrusive because only the lens is exposed; the electronics are hidden in the device housing or in the junction box in the ceiling. In addition, the present invention may be mounted directly to an opening in a ceiling that does not have a junction box, which is particularly suitable in a retrofit installation.

In particular, the present invention is a ceiling-mounted passive infrared detector assembly that has three main components: a junction box (optional) which is adapted to be mounted within an opening in a ceiling; a cover adapted to mate with the junction box (or within an opening in the ceiling itself); and an electronic passive infrared detector subassembly including an infrared sensor and processing circuitry for processing electrical signals generated by the infrared sensor and producing output signals. The cover has mounting means such as a flange adapted to mount to the junction box and an extended portion with a cavity and an aperture. The cover also has a lens array (such as a Fresnel lens array as well known in the art) located across the aperture. The electronic passive infrared detector subassembly is located with respect to the cover such that the infrared sensor is aligned with the lens array when the cover is mounted to the junction box such that the infrared sensor detects infrared energy passed through the lens array from a field of view defined by the juxtaposition of the lens array and the infrared sensor.

The electronic passive infrared detector subassembly includes a printed circuit board on which the infrared sensor and the processing circuitry are mounted. The printed circuit board may extend away from the cover whereby at least a first part of the printed circuit board will be located within the junction box when the cover is mounted to the junction box, and at least a second part of the printed circuit board may be located within the cavity when the cover is mounted to the junction box. The printed circuit board will be preferably mounted at an oblique angle such that the field of view extends from the ceiling in a direction generally downwards.

The assembly includes either wireless transmission means for wirelessly transmitting the output signals to an associated alarm system, or wired transmission means for transmitting the output signals to the associated alarm system via a wired interface.

BEST MODE FOR CARRYING OUT THE INVENTION

Figure 1:
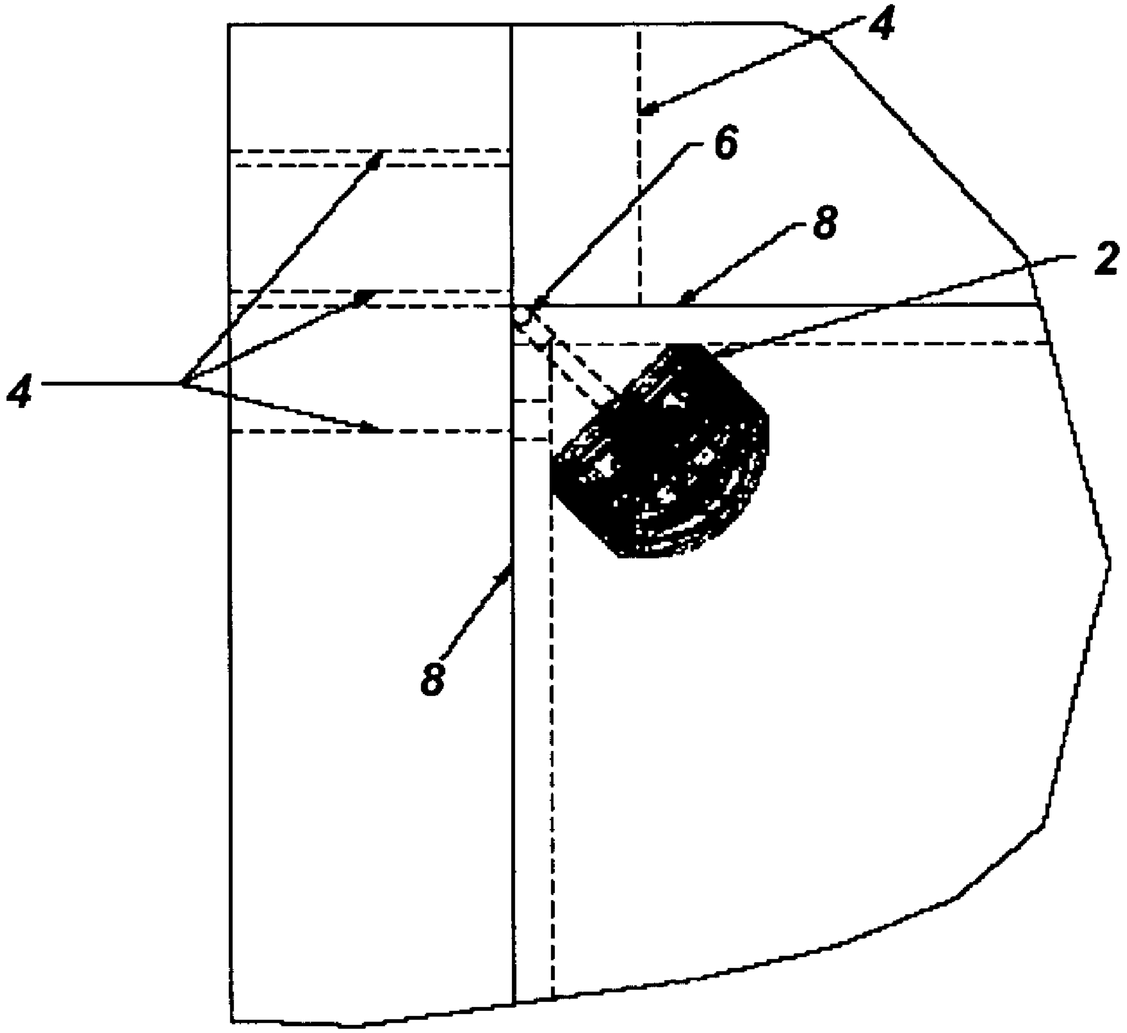
FIG. 1 PRIOR ART
FIG. 1 is an illustration of a prior art PIR assembly mounted in a corner of a room.
Figure 2:
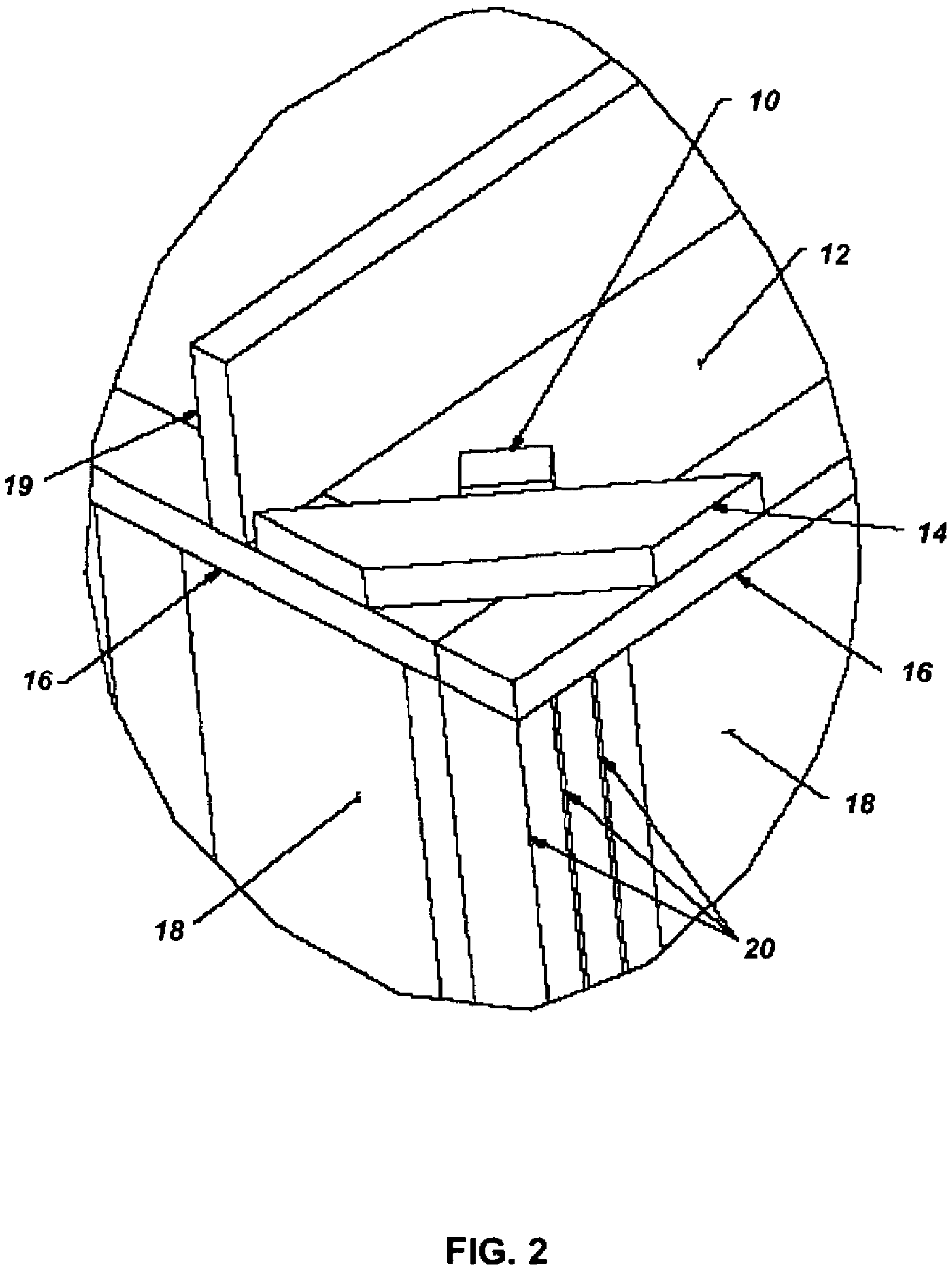
FIG. 2 is an illustration of a junction box of the present invention mounted with a ceiling space near the corner of a room.

The preferred embodiments of the present invention will now be described with respect to the Figures. FIG. 2 illustrates the placement of a junction box 10 within the ceiling space of a premises. Typically, the corner of a room will have vertical supports 20 on which horizontal supports 16 will be located. An angle support 14 may also be used to reinforce the structural integrity of the construction. FIG. 2 also illustrates the placement of sheetrock for the ceiling 12 as well as the wall 18, all as well known in the art. FIG. 2 also illustrates the placement of the junction box 10 near or against the angle support 14, which will provide structural integrity and stability for subsequent mounting of the device as described herein. In the event that the device will be a wired-type device, then the wiring harness will be located such that the ends of the wires extend into the junction box 10 for later wiring (see FIG. 3). If, however, the device will be of the wireless type, then no wiring harness will be located at the junction box 10.

Figure 3:
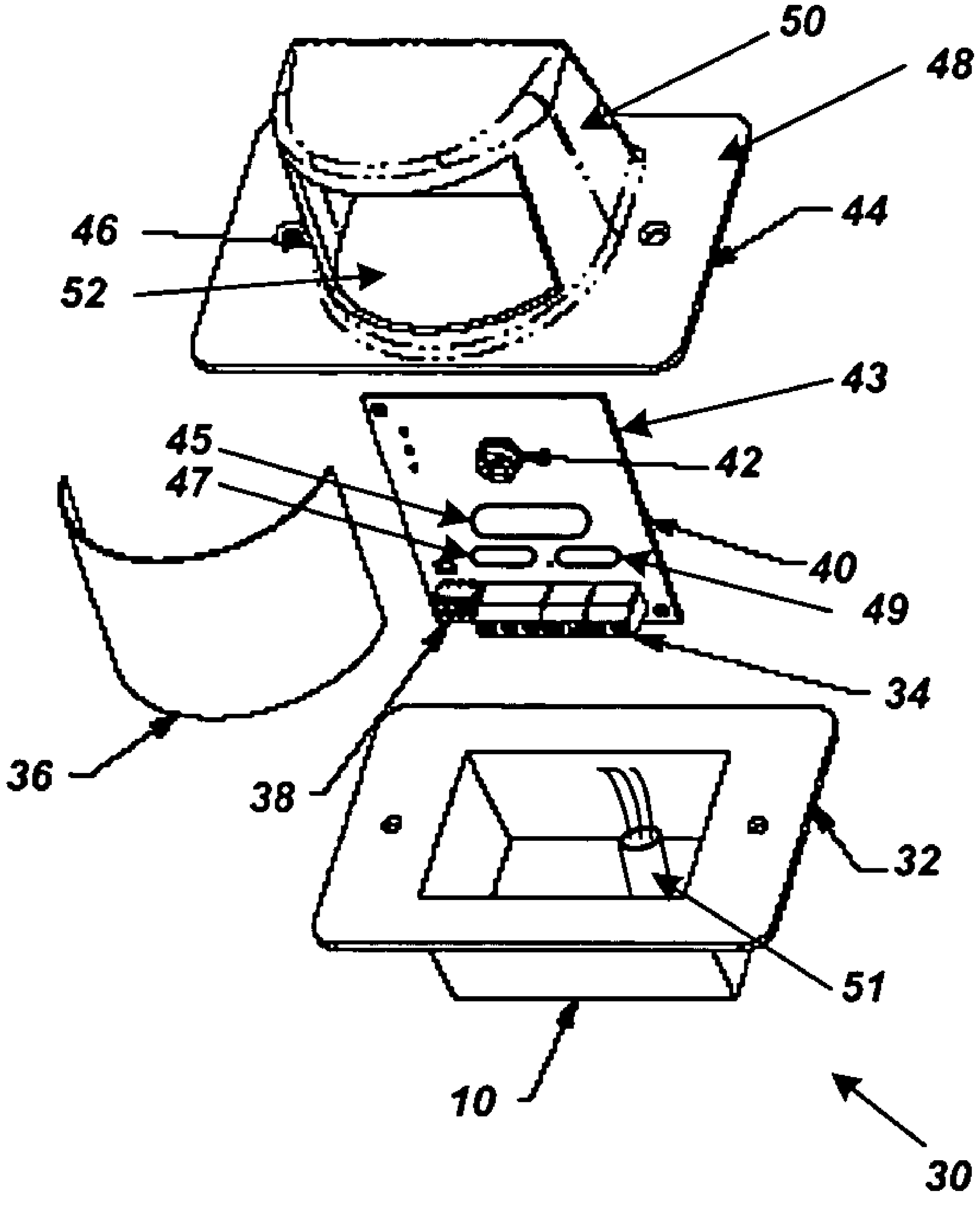
FIG. 3 is an exploded view of a first embodiment of a ceiling-mountable passive infrared detector device suitable for mounting in a ceiling space.

The ceiling-mounted passive infrared detector assembly 30 of the first embodiment has three main components; the first one is junction box 10, which is adapted to be mounted within an opening in a ceiling as described above. With reference to FIG. 3, the second main component of the ceiling-mounted passive infrared detector assembly of the preferred embodiment is a cover 44 that is adapted to mate with the junction box 10.

The cover 44 has mounting means, which in the preferred embodiments is a flange 48 adapted to mount to the junction box 10 (shown here to mate to a trim plate 32 of the junction box 10). The cover 44 also has and an extended portion 50 with a cavity 52 and an aperture 46. The extended portion 50 is located substantially perpendicular to the ceiling and to the planar area that is defined by the flange 48. The cover 44 also has a lens array 36 located across the aperture wherein the lens array 36 is substantially perpendicular to the planar area defined by the flange 48.

The third main component of the ceiling-mounted passive infrared detector assembly of the first embodiment is an electronic passive infrared detector subassembly 43, which includes an infrared sensor 42 and processing circuitry 45 for processing electrical signals generated by the infrared sensor 42 and producing output signals as well known in the art. The electronic passive infrared detector subassembly 43 is located with respect to the cover such that the infrared sensor 42 is aligned with the lens array 36 when the flange 48 is mounted to the junction box 10 such that the infrared sensor 42 detects infrared energy passed through the lens array 36 from a field of view defined by the juxtaposition of the lens array 36 and the infrared sensor 42 (see also FIG. 8).

Figure 7:
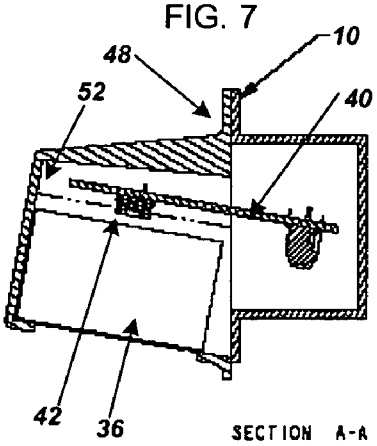
FIG. 7 is a cross-sectional view of the device of FIG. 5 taken along line A-A.

The electronic passive infrared detector subassembly 43 includes a printed circuit board 40 on which the infrared sensor 42 and the processing circuitry 45 are mounted. With additional reference to FIG. 7, the printed circuit board may extend away from the cover 44 whereby at least a first part of the printed circuit board 40 will be located within the junction box 10 when the flange 48 is mounted to the junction box 10, and at least a second part of the printed circuit board 40 may be located within the cavity 52 when the flange 48 is mounted to the junction box 10. The printed circuit board 40 will be preferably mounted at an oblique angle such that the field of view extends from the ceiling in a direction generally downwards (see also FIG. 8).

The assembly includes either wireless transmission circuitry 47 for wirelessly transmitting the output signals to an associated alarm system (not shown) as well known in the art, or wired transmission circuitry 49 for transmitting the output signals to the associated alarm system via a wired interface (wire harness 51 via terminal block 34) as well known in the art. Also shown are DIP switches 38 that are used to set device parameters such as bus address as well known in the art.

The cover 44 may be mounted to the junction box 10 by conventional means such as machine screws or the like. Similarly, the subassembly 43 is mounted to the cover 44 in any known manner, such as screws, press fit tension tabs, etc. In the alternative, the subassembly 43 may be mounted to the junction box 10 and then the cover placed on the junction box for final assembly.

Figure 4:
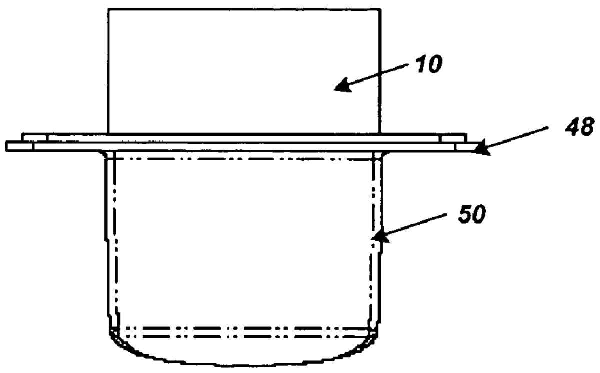
FIG. 4 is a rear view of the ceiling-mountable passive infrared detector device of FIG. 3.
Figure 5:
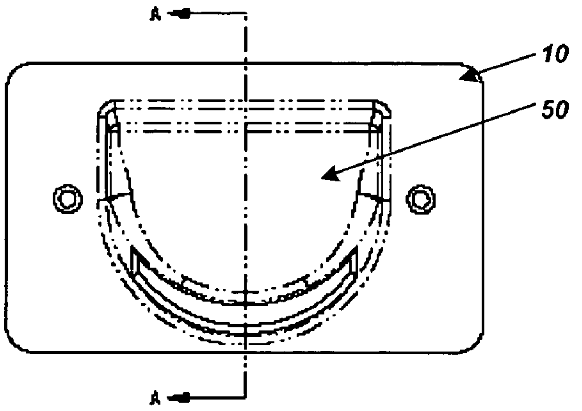
FIG. 5 is a bottom view of the ceiling-mountable passive infrared detector device of FIG. 3.
Figure 6:
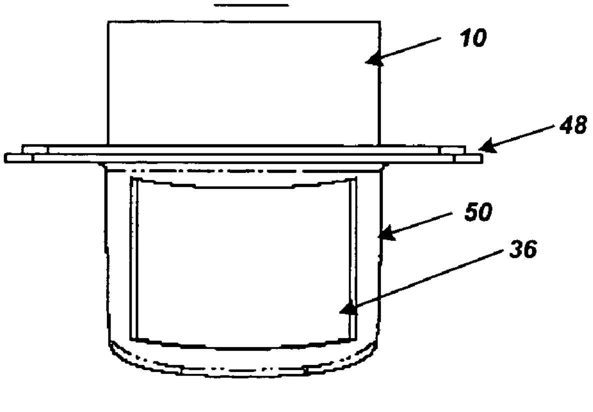
FIG. 6 is a front view of the ceiling-mountable passive infrared detector device of FIG. 3.

FIGS. 4-6 show various views of the present invention as an aid in understanding the final assembly.

Figure 8:
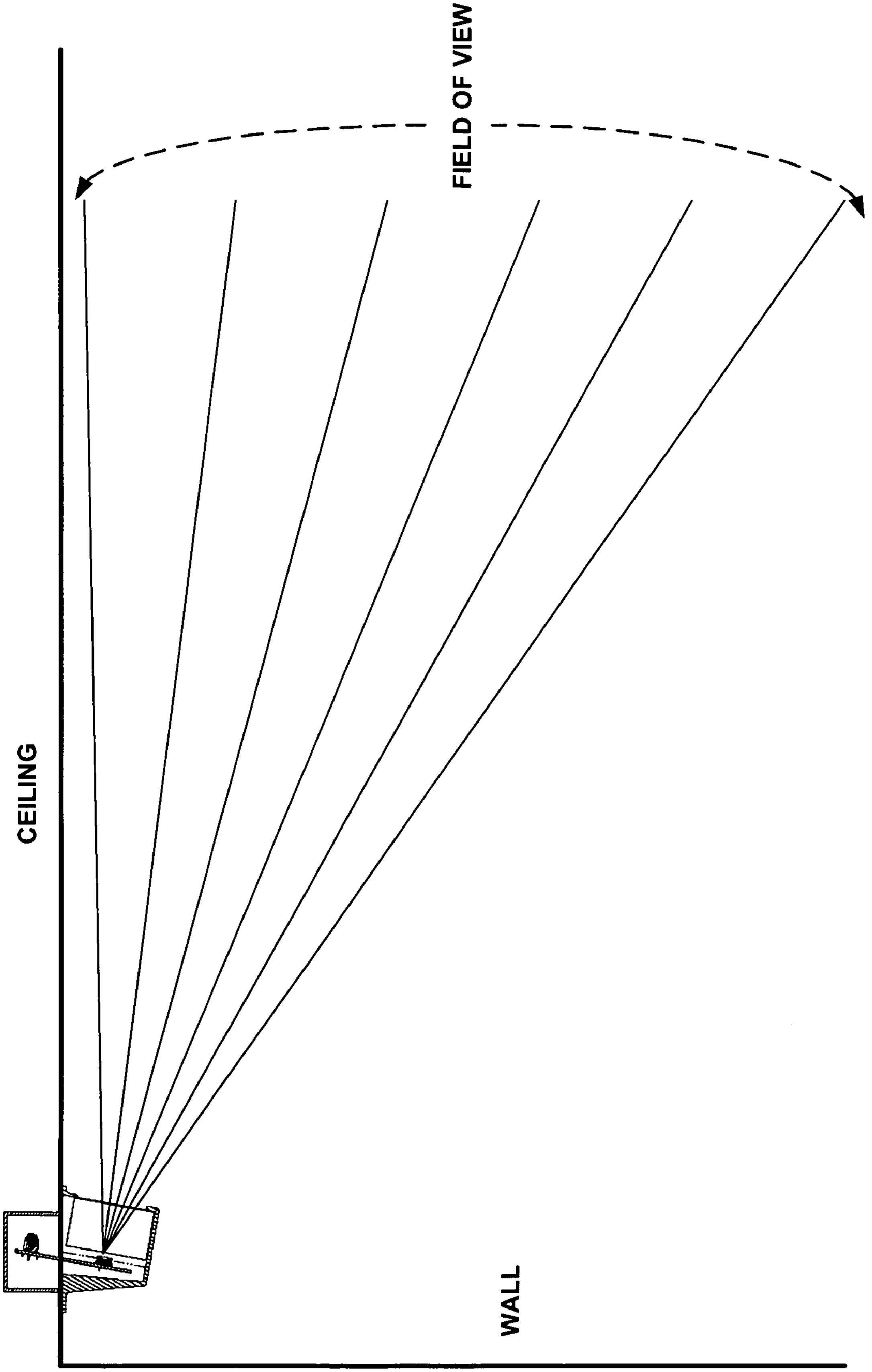
FIG. 8 illustrates the field of view of the ceiling-mountable passive infrared detector device of the present invention.

The operation of the present invention; i.e. the operation of a PIR assembly utilized in an alarm system, is well known in the art and need not be repeated herein. What is novel and unobvious about the present invention is the configuration of the sensor 42 with respect to the lens array 36 and the integration of the subassembly 43 with the junction box 10 that allows for ease of installation while maintaining structural integrity of the installation and providing for optimal coverage in the resulting field of view. FIG. 8 illustrates a typical field of view provide by the present invention when mounted on a ceiling-mounted junction box as described herein.

As previously mentioned, the use of a junction box with the present invention may be optional. That is, it may be desired to install the device in a retrofit application, such as in an existing building. In that case, it may not be necessary to utilize a junction box if the structure of the ceiling will allow direct mounting of the cover to an opening in a ceiling. In this case, the opening is made to allow insertion of the exposed part of the printed circuit assembly, and the cover is mated to the surrounding ceiling area by any means in the art such as wing nuts, molly bolts, and the like. This may be particularly applicable when the device communicates with the alarm system wirelessly (e.g. RF signals) so that there is no need to fasten a wiring harness to the device.

Figure 9A:
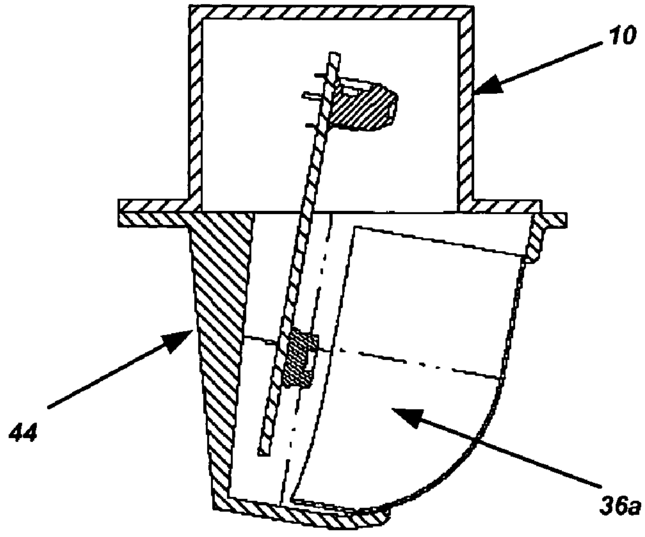
FIG. 9A is an illustration of a second embodiment of a ceiling-mountable passive infrared detector device suitable for mounting in a ceiling space.
Figure 9B:
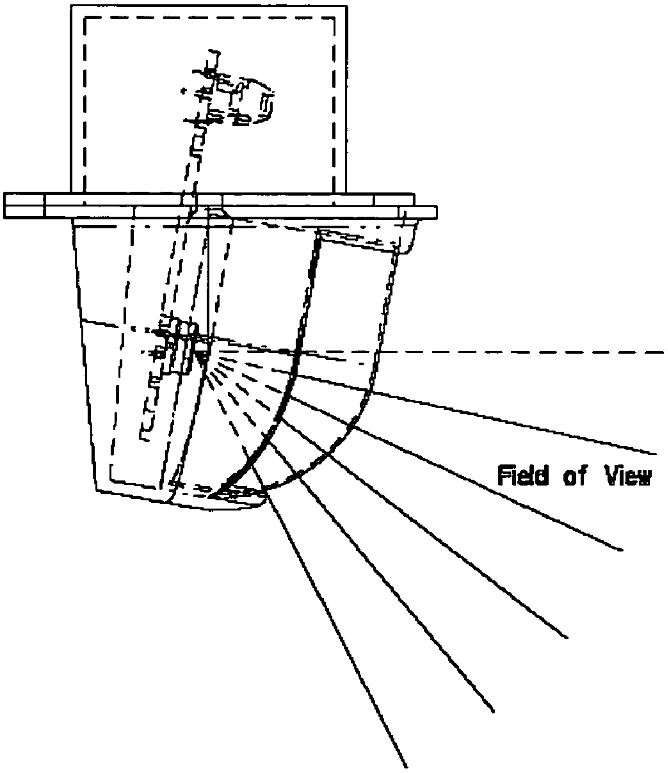
FIG. 9B illustrates the field of view resulting from the ceiling-mountable passive infrared detector device of FIG. 9A.
Figure 10:
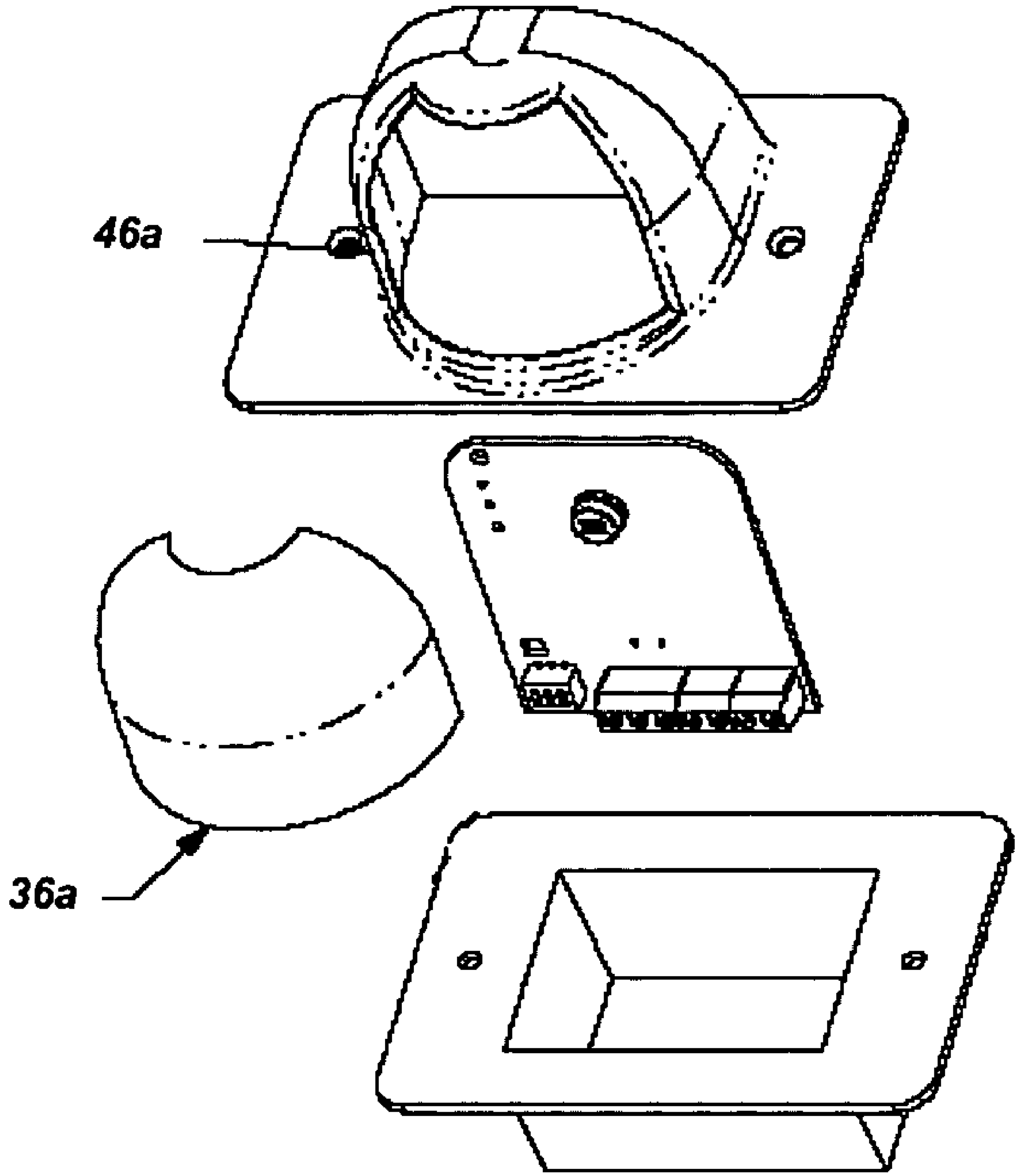
FIG. 10 is an exploded view of the ceiling-mountable passive infrared detector device of FIG. 9A.
Figure 11:
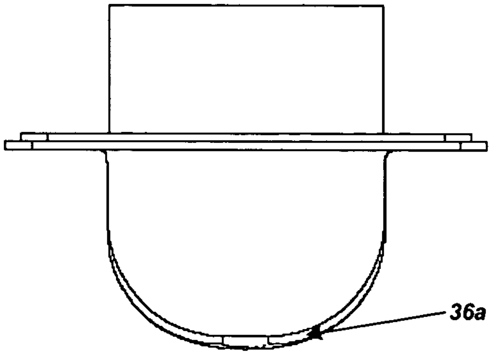
FIG. 11 is a rear view of the ceiling-mountable passive infrared detector device of FIG. 9A.
Figure 12:
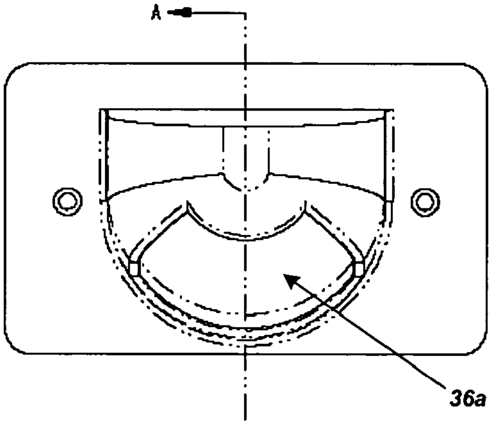
FIG. 12 is a bottom view of the ceiling-mountable passive infrared detector device of FIG. 9A.
Figure 13:
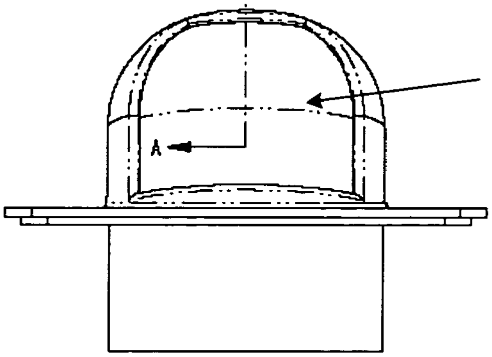
FIG. 13 is a front view of the ceiling-mountable passive infrared detector device of FIG. 9A.
Figure 14:
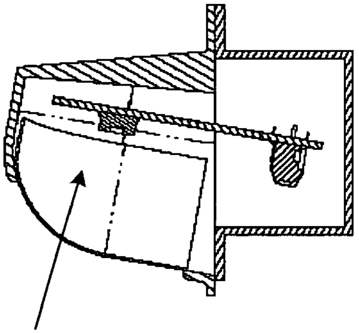
FIG. 14 is a cross-sectional view of the device of FIG. 12 taken along line A-A.

FIG. 9A illustrates a second embodiment of the present invention, which is essentially the same as the first embodiment except for the design of the aperture **46*a* and lens assembly 36*a*. As seen in FIGS. 9A, 10, 11, 12, 13 and 14, the lens assembly 36*a* has a curved end that wraps around a bottom portion of the device so as to provide an extended field of view, as shown by FIG. 9**B. This extends the field of view more downwardly towards the floor section closer to the device and provides a greater range of coverage if desired. All other aspects of operation of this second embodiment are the same as with the first embodiment as described above.

In a further alternative embodiment, other types of devices besides PIR sensors may be utilized in the ceiling-mounted application of the present invention.

What is claimed is:

1. A ceiling-mountable passive infrared detector device suitable for mounting to a ceiling, comprising:

a) a cover comprising
 mounting means adapted to mount the cover to an opening in a ceiling;
 an extended portion comprising a cavity and an aperture, and
 a lens array located across said aperture; and b) an electronic passive infrared detector subassembly comprising a printed circuit board on which an infrared sensor and processing circuitry are mounted, wherein said processing circuitry is for processing electrical signals generated by the infrared sensor and producing output signals;

wherein the electronic passive infrared detector subassembly is located with respect to the cover such that the infrared sensor is aligned with the lens array when the cover is mounted to an opening in a ceiling such that the infrared sensor detects infrared energy passed through the lens array from a field of view defined by the juxtaposition of the lens array and the infrared sensor, in which the printed circuit board extends away from the cover whereby at least a first part of the printed circuit board will be located within the opening in the ceiling when the cover is mounted to the ceiling.

2. The device of claim 1 wherein the mounting means adapted to mount the cover to an opening in a ceiling comprises a flange.

3. The device of claim 1 wherein at least a second part of the printed circuit board is located within the cavity when the cover is mounted to the ceiling.

4. The device of claim 3 wherein the printed circuit board is mounted at an oblique angle with respect to the ceiling such that the field of view extends from the ceiling in a direction generally downwards.

5. The device of claim 4 wherein the optical assembly can be adjusted with respect to the ceiling to change the field of view of the sensor.

6. The device of claim 1 further comprising wireless transmission means for wirelessly transmitting said output signals to an associated alarm system.

7. The device of claim 1 further comprising wired transmission means for transmitting said output signals to an associated alarm system via a wired interface.

8. The device of claim 1 wherein the mounting means is further adapted to mount the cover to a junction box recessed in the ceiling.

9. A ceiling-mounted passive infrared detector assembly comprising:

a) a junction box comprising a housing and an opening, said junction box adapted to be mounted within an opening in a ceiling;

b) a cover comprising mounting means adapted to mount the cover to the junction box;

an extended portion comprising a cavity and an aperture, and a lens array located across said aperture; and c) an electronic passive infrared detector subassembly comprising a printed circuit board on which an infrared sensor and processing circuitry are mounted, wherein said processing circuitry is for processing electrical signals generated by the infrared sensor and producing output signals;

wherein the electronic passive infrared detector subassembly is located with respect to the cover such that the infrared sensor is aligned with the lens array when the cover is mounted to the junction box recessed in the ceiling such that the infrared sensor detects infrared energy passed through the lens array from a field of view defined by the juxtaposition of the lens array and the infrared sensor, in which the printed circuit board extends away from the cover whereby at least a first part of the printed circuit board will be located within the junction box when the cover is mounted to the junction box.

10. The assembly of claim 9 wherein the mounting means is adapted to mount the cover to a junction box comprises a flange.

11. The assembly of claim 9 wherein at least a second part of the printed circuit board is located within the cavity when the cover is mounted to the junction box.

12. The assembly of claim 11 wherein the printed circuit board is mounted at an oblique angle such that the field of view extends from the ceiling in a direction generally downwards.

13. The assembly of claim 12 wherein the optical assembly can be adjusted with respect to the junction box to change the field of view of the sensor.

14. The assembly of claim 9 further comprising wireless transmission means for wirelessly transmitting said output signals to an associated alarm system.

15. The assembly of claim 9 further comprising wired transmission means for transmitting said output signals to an associated alarm system via a wired interface.

16. A method of mounting a passive infrared detector assembly to a ceiling comprising the steps of:

a) mounting a junction box with respect to an opening in a ceiling, the junction box comprising a housing and an opening; and b) mounting a passive infrared detector device to the junction box, the passive infrared detector device comprising:

a cover comprising a mounting means adapted to mount the cover to the junction box;

an extended portion comprising a cavity and an aperture; and a lens array located across said aperture; and an electronic passive infrared detector subassembly comprising a printed circuit board on which an infrared sensor and processing circuitry are mounted, wherein said processing circuitry is for processing electrical signals generated by the infrared sensor and producing output signals;

wherein the electronic passive infrared detector subassembly is located with respect to the cover such that the infrared sensor is aligned with the lens array when the cover is mounted to the junction box such that the infrared sensor detects infrared energy passed through the lens array from a field of view defined by the juxtaposition of the lens array and the infrared sensor, wherein the printed circuit board extends away from the cover whereby at least a first part of the printed circuit board will be located within the function box when the cover is mounted to the junction box.

* * * * *